US010623324B2

(12) United States Patent
Reddy et al.

(10) Patent No.: US 10,623,324 B2
(45) Date of Patent: Apr. 14, 2020

(54) OPTIMIZED DOMAIN WHITELISTING

(71) Applicant: Cisco Technology, Inc., San Jose, CA (US)

(72) Inventors: K. Tirumaleswar Reddy, Karnataka (IN); Prashanth Patil, San Jose, CA (US); Daniel G. Wing, Truckee, CA (US)

(73) Assignee: Cisco Technology, Inc., San Jose, CA (US)

( * ) Notice: Subject to any disclaimer, the term of this patent is extended or adjusted under 35 U.S.C. 154(b) by 477 days.

(21) Appl. No.: 15/152,841

(22) Filed: May 12, 2016

(65) Prior Publication Data
US 2017/0331780 A1    Nov. 16, 2017

(51) Int. Cl.
*G06F 15/16* (2006.01)
*H04L 12/851* (2013.01)
*H04L 29/12* (2006.01)
*H04L 29/08* (2006.01)
*H04L 29/06* (2006.01)
*H04L 12/725* (2013.01)
*H04L 12/721* (2013.01)

(52) U.S. Cl.
CPC ........ *H04L 47/2483* (2013.01); *H04L 45/306* (2013.01); *H04L 61/1511* (2013.01); *H04L 61/6013* (2013.01); *H04L 67/02* (2013.01); *H04L 69/16* (2013.01); *H04L 45/66* (2013.01); *H04L 61/6009* (2013.01)

(58) Field of Classification Search
None
See application file for complete search history.

(56) References Cited

U.S. PATENT DOCUMENTS 8,327,128 B1 * 12/2012 Prince ................ H04L 63/0823
                                                    713/150
9,722,870 B2 *  8/2017 Rattner ............... H04L 41/0816
(Continued)

OTHER PUBLICATIONS

"Whitelist Download from Tower for Proxy Cloud Web Security", Security Configuration Guide: Cloud Web Security, Cisco IOS Release 15M&T, Jan. 12, 2015, 8 pages.
(Continued)

*Primary Examiner* — Brian Whipple
*Assistant Examiner* — Anthony T Rotolo
(74) *Attorney, Agent, or Firm* — Edell, Shapiro & Finnan, LLC

(57) ABSTRACT

An optimized approach to whitelisting includes, at a domain name service server, determining whether a first domain and a second domain resolve to a same Internet Protocol (IP) address, and in response to a request from a domain name service proxy as to whether the first domain resolves to an IP address shared by another domain, notifying the domain name service proxy that the first domain resolves to an IP address shared by another domain. The method further includes the domain name service proxy receiving from the domain name service server a response that indicates that the first domain resolves to an IP address shared by another domain, and storing, in memory, the IP address and an indication that the IP address is shared by another domain. A data flow associated with a shared IP address is subjected to further scrutiny even if the IP address is on a whitelist.

12 Claims, 4 Drawing Sheets

(56) References Cited

U.S. PATENT DOCUMENTS

| | | | | |
|---|---|---|---|---|
| 9,762,543 B2* | 9/2017 | Xie | ............... | H04L 63/0236 |
| 9,838,425 B2* | 12/2017 | Jalan | ............... | H04L 63/1466 |
| 9,860,167 B2* | 1/2018 | Oliver | ............... | H04L 29/12066 |
| 2010/0235915 A1* | 9/2010 | Memon | ............... | H04L 63/145 |
| | | | | 726/23 |
| 2011/0078309 A1* | 3/2011 | Bloch | ............... | H04L 29/12066 |
| | | | | 709/224 |
| 2014/0109225 A1* | 4/2014 | Holloway | ............... | H04L 63/1458 |
| | | | | 726/23 |
| 2016/0173439 A1* | 6/2016 | Kaliski, Jr. | ............... | H04L 61/10 |
| | | | | 709/245 |
| 2016/0330287 A1* | 11/2016 | Smith | ............... | H04L 67/18 |
| 2018/0026935 A1* | 1/2018 | Ripke | ............... | H04L 61/1511 |

OTHER PUBLICATIONS

"Q&A: How do I make Office 365 work with the Cloud Web Security Connector?", https://techzone.cisco.com/t5/tkb/articleprintpage/tkb-id/native_connector . . . , Feb. 21, 2013, 3 pages.

\* cited by examiner

| SHARED? | IP ADDRESS | DOMAIN NAME |
|---|---|---|
| Y | 1.2.3.4 | XYZ.COM |
| N | 5.6.7.8 | WEB.COM |
| Y | 1.2.3.4 | ABC.COM |
| N | 10.11.12.13 | STORE.COM |
| | | |
| | | |

| WHITELIST? | SHARED? | IP ADDRESS | DOMAIN NAME |
|---|---|---|---|
| Y | Y | 1.2.3.4 | XYZ.COM |
| N | N | 5.6.7.8 | WEB.COM |
| N | Y | 1.2.3.4 | ABC.COM |
| Y | N | 10.11.12.13 | STORE.COM |
| | | | |
| | | | |

FIG.3B

OPTIMIZED DOMAIN WHITELISTING

TECHNICAL FIELD

Embodiments described herein relate to network security, and particularly to a methodology to optimize domain whitelisting.

BACKGROUND

Whitelisting is a feature that enables data flows associated, e.g., with applications, emails, and data, generally, to traverse a network element, such as a router, switch or firewall, without further inspection or scrutiny. That is, when given traffic or a data flow is determined to be on a network element's whitelist, that traffic or flow is permitted to traverse the network element without requiring additional processing or overhead.

One form of whitelisting is Domain-based whitelisting. Domain-based whitelisting whitelists traffic flowing to/from selected domains and ensures that such traffic is not subjected to additional inspection. This type of whitelisting is implemented to avoid the overhead of inspecting selected flows that may not warrant inspection (e.g., YouTube™ or other video traffic), or to avoid inspecting traffic destined to/received from domains that carry sensitive information (e.g., personal banking traffic which may not be allowed, in certain countries, to be decrypted, even within an Enterprise network).

BRIEF DESCRIPTION OF THE DRAWINGS

FIGS. 3A and 3B are example tables or caches that stores IP addresses and associated domain names, and an indication whether a given IP address handles multiple domains and/or whether the given IP address should be whitelisted according to an example embodiment.

DESCRIPTION OF EXAMPLE EMBODIMENTS

Overview

Figure 1:
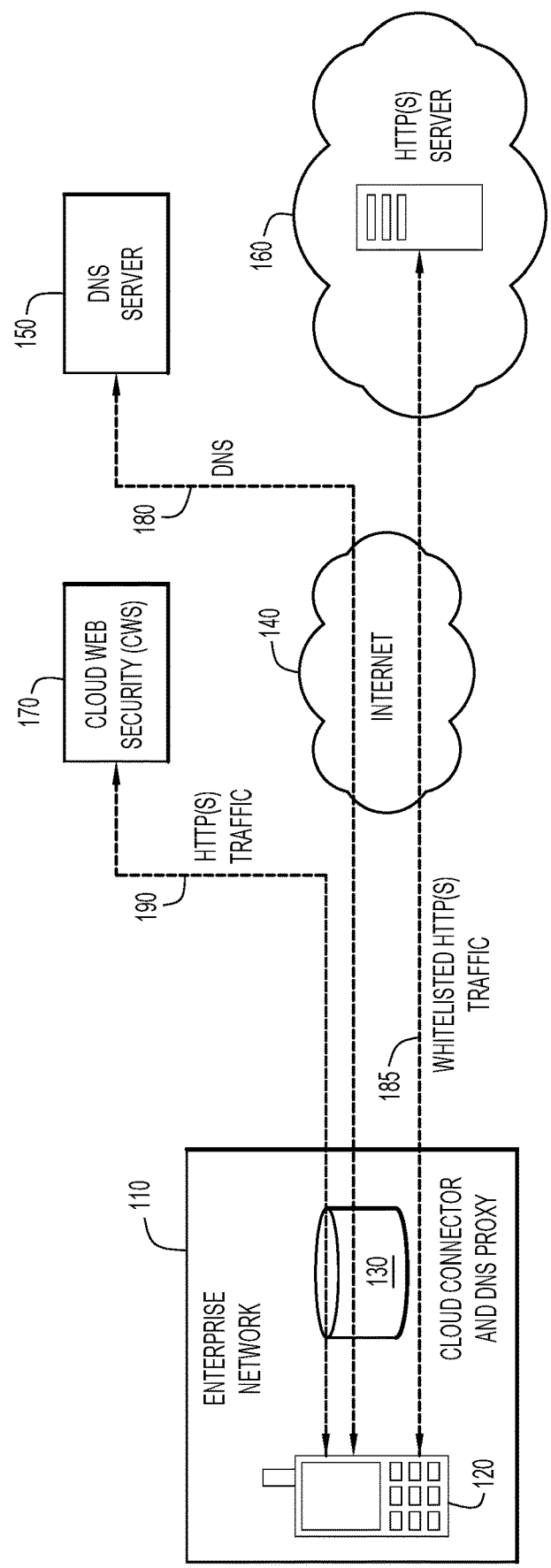
FIG. 1 depicts a network topology including a DNS proxy and DNS server according to an example embodiment.

In one embodiment there is provided a method including, at a domain name service server, determining whether a first domain and a second domain resolve to a same Internet Protocol (IP) address, and in response to a request from a domain name service proxy operating on a network device as to whether the first domain resolves to an IP address shared by another domain, notifying the domain name service proxy that the first domain resolves to an IP address shared by another domain when the first domain resolves to an IP address shared by another domain.

In another embodiment there is provided a method including receiving, from a host device, a domain name service request for a first domain, sending the domain name service request for the first domain to a domain name service server, and including therein a query as to whether the first domain resolves to an Internet Protocol (IP) address shared by another domain, receiving from the domain name service server a response that indicates that the first domain resolves to an IP address shared by another domain, and storing, in memory, the IP address and an indication that the IP address is shared by another domain. A data flow associated with a shared IP address is subjected to further scrutiny even if the IP address is on a whitelist.

Example Embodiments

In one mode of generating a whitelist and operating a network device responsive to such a whitelist, IP addresses are resolved for domains, and rules are created to whitelist traffic destined to/received from such IP addresses. However, there is a potential problem with this approach in that a given IP address can be shared by multiple domains. That is, one IP address might resolve to several domains or, stated alternatively, multiple domains might resolve to a same IP address. This can happen in the case of content being served by a Content Distribution Network (CDN) that hosts multiple domains and which might be accessible via a single IP address. A similar issue arises when multiple domains are registered against a single proxy service. In such cases, a network device might improperly whitelist domains that should not to be whitelisted. That is, if a given domain is deemed to be eligible to be whitelisted and the IP address of that domain is accordingly added to a whitelist, any subsequent traffic associated with that IP address, regardless of the domain being communicated with, will not be subjected to additional scrutiny, even though a flow from a given domain should indeed be subjected to additional scrutiny.

One approach to overcome this issue is to employ a cloud web security (CWS) connector (i.e., a service) that can be configured to act as a TCP proxy for all white-listed flows. The CWS connector first re-directs HTTP(S) flows to the CWS. After TCP session establishment, the CWS inspects the HTTP header or Transport Layer Security (TLS) handshake to determine if the flow is to be indeed whitelisted. If the flow is to be whitelisted, the CWS connector creates a new TCP connection with the original content provider to relay the traffic between the client and content provider. On the original TCP connection to the CWS, the connector sends a TCP RST to terminate the connection. The HTTP(S) client is agnostic to multiple TCP connections.

Firewalls resort to inspecting all flows to determine the domain name. For HTTPS, if the firewall does not want to be a TLS proxy, the firewall inspects the TLS handshake and validates the server certificate sent in ServerHello to determine the destination domain. In either case, a firewall may inspect all whitelisted flows. Such operations, however, can be very inefficient.

In TLS 1.3, most of the TLS handshake is encrypted, so the device has to act as TLS proxy and trigger a TLS handshake with the TLS server to determine the destination domain for white-listing. In such a scenario there are three TCP connections that need to be established: a first TCP connection between the TLS client and TLS proxy, a second TCP connection between the TLS proxy and TLS server for server certificate validation, and a third TCP connection between the TCP proxy and TLS server to relay TLS client and server traffic. This can also be rather inefficient.

Embodiments described herein provide a mechanism for network devices to only act as TCP proxy for HTTP(S) flows to whitelisted domains whose IP addresses are shared by other domains and to only act as TLS proxy for TLS 1.3 flows to whitelisted domains whose IP addresses are shared by other domains (which avoids, for such traffic, the three TCP connections for HTTPS flow noted above). That is, according to the embodiments described herein, increased scrutiny is applied to domains that share an IP address.

As will be explained in more detail, the embodiments described herein enable a DNS security service to determine if multiple domains resolve to the same IP Address. This could happen if content for multiple domains are served from the same content delivery network (CDN) or if multiple domains are registered against a single IP. A gateway/DNS Proxy uses this information to determine if traffic destined to that IP address needs further inspection, especially if the domain was whitelisted.

Thus, in accordance with this approach (a) a DNS security service determines that multiple domains resolve to the same IP, and then, at some future time, (b) a DNS proxy uses that information to optimize its whitelisting operations.

More specifically, a DNS security service, within the scope of a DNS proxy, determines if domains requested by a site or a requester (e.g., a DNS proxy) resolve to a same IP address. Such a mapping service, to identify which DNS names resolve to the same IP address, is a function that may be provided through an application programming interface (API) made available by many DNS servers. For example, a DNS server can provide an API that can be queried to learn all DNS names that resolve to the same IP address. Google provides a similar API to its DNS servers. Thus, for example, the DNS security service may query a DNS server for "foo.example.com" and it resolves to 1.2.3.4, and another query to the DNS server for "bank.ru" also resolves to 1.2.3.4, the fact (that both names resolve to the same IP address) is noticed by the DNS server and can be determined by asking the DNS server, effectively: "I have the IP address 1.2.3.4, what names does it have?". The fact that certain domains share an IP address can be suspicious and, thus, in accordance with embodiments described herein, traffic associated with such domains may be subjected to increased scrutiny.

In one implementation, if the domain name in a DNS request is a whitelisted domain, then the DNS proxy on the network device adds an Extension DNS (EDNS) option to the request, asking the DNS security service to signal back in the DNS response if the IP address is used by other domains.

In response, the DNS Security service adds an EDNS option in the DNS response signaling that the resolved IP address is shared by other domains.

The DNS inspection agent on the network device caches the IP addresses corresponding to the domain name in the whitelist (referred to as, e.g., DNS inspection cache) and marks the IP address when the IP address is shared by multiple domains.

A CWS connector (which operates along side the DNS proxy) checks if the destination IP address in a SYN packet matches the IP address in the DNS inspection cache. If the match is successful and the IP address is not shared by other domains, then the flow is whitelisted (i.e., the flow is not subjected to further inspection). On the other hand, if the match is successful, but the IP address is shared by other domains (i.e., the IP address was marked in the DNS inspection cache) then the flow is not whitelisted and is subjected to further inspection (e.g., by inspecting the TLS handshake for HTTPS flows and inspecting HTTP header for HTTP flows). More specifically, the DNS inspection agent and CWS connector are features co-located on, e.g., a router in the data-plane, and the DNS inspection cache is maintained by the DNS inspection agent. The CWS connector in the ingress path checks if the SYN packet is destined to HTTP(S) servers in the Enterprise network. If the packet is destined to HTTP(S) server in the Enterprise network then the flow is of no interested to CWS connector and packets of the flow take a normal route. If the packet is not destined to HTTP(S) servers in the Enterprise network then the CWS connector checks if the destination IP address in the SYN packet matches the IP address in the DNS inspection cache.

If the match is not successful (no presence of the IP address in the DNS inspection) then the flow will re-directed to CWS (Data Center) for inspection.

If the match is successful and the IP address is not shared by other domains, then the flow is whitelisted, i.e. flow will not be re-directed to the CWS Data Center.

If the match is successful and the IP address is shared by other domains (i.e., the IP address was marked in the DNS inspection cache) then the flow is subjected to further inspection and continued to be re-directed to CWS Data Center. For this latter case and for an HTTPS flow, the CWS connector acts as TLS proxy and triggers a TLS handshake with the server to validate the server certificate and determine the destination domain for whitelisting. For an HTTP flow, the CWS inspects the HTTP request to determine the destination domain. If the destination domain is whitelisted then the CWS connector creates a new TCP connection with the HTTP(S) server to relay the traffic between the client and HTTP(S) server. On the original TCP connection to the CWS DC, the connector sends a TCP RST to terminate the connection. The HTTP(S) client is agnostic to multiple TCP connections. In this scenario, there are three TCP connections as explained previously above.

Reference is now made to FIG. 1, which depicts a network topology including a DNS proxy and DNS server according to an example embodiment. More specifically, FIG. 1 shows a host device 120 operating within an enterprise network 110. Host device may be a mobile phone or device, a computer, laptop, or any other communication device configured to communicate over the Internet 140 with another end point. Enterprise network 110 includes cloud connector and DNS proxy 130, the function of which will be explained in more detail below.

A DNS server 150 (which may operate as an OpenDNS server) is accessible via the Internet 140 as are HTTP(S) server 160 and cloud web security (CWS) 170.

FIG. 1 also depicts several data flows. A first data flow 180 is a flow to and from DNS server 150, a second data flow 185 is indicated as whitelisted HTTP(S) traffic to and from HTTP(S) server 160, and a third data flow 190 is indicated as HTTP(S) traffic to and from CWS 170. This latter data flow is traffic that is, as explained below, not whitelisted, and is therefore subjected to increased scrutiny by, e.g., CWS 170.

Figure 2:
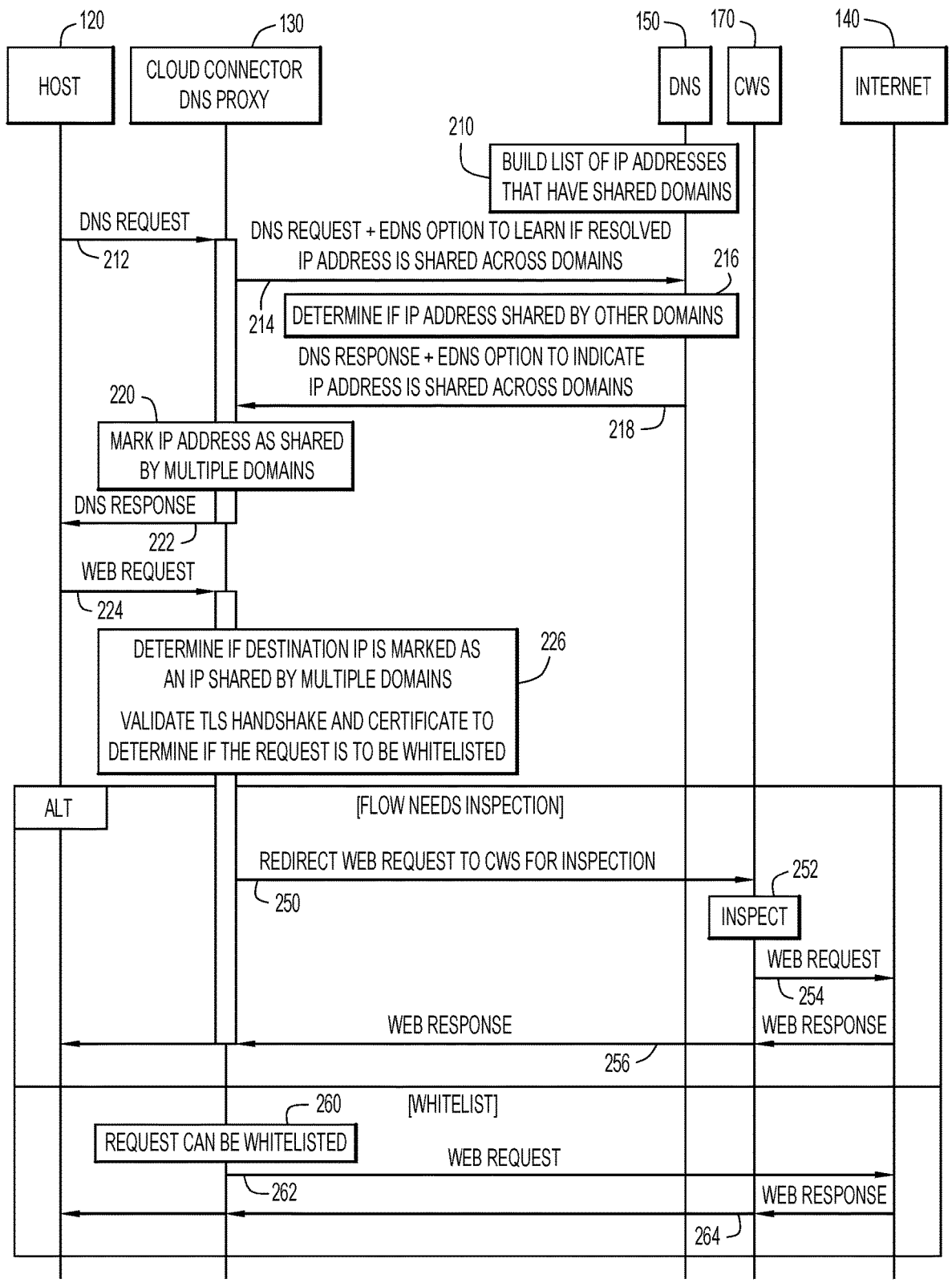
FIG. 2 is a sequence diagram depicting operations for determining whether a given dataflow can be whitelisted based on whether the IP address of the given dataflow handles multiple domains according to an example embodiment.

FIG. 2 is a sequence diagram depicting operations for determining whether a given data flow can be whitelisted based on whether the IP address of the given data flow handles multiple domains according to an example embodiment. More specifically, FIG. 2 shows the same network components as FIG. 1, namely host 120, cloud connector/DNS proxy 130, DNS server 150, CWS 170 and the Internet 140.

At 210, DNS server 150 is configured to process its data to build a list of IP addresses that have shared domains. As those skilled in the art appreciate, a DNS server stores associations between domain names and IP addresses. When a host device (e.g., host 120) is operating a web browser, and receives user input of a domain name, the host device does not know the IP address to which to address traffic towards that domain. A DNS server is used to identify the IP address corresponding to the desired domain, and return that IP address to the web browser so that traffic can be sent using the appropriate IP address.

Again, at operation 210, DNS server 150 is configured to identify IP addresses that have shared domains. With reference to FIG. 3A, this can be accomplished by adding a flag or marking column in an appropriate database 300 that indicates whether a given IP address serves multiple domains, i.e., is the IP address shared? As shown in FIG. 3A, IP address 1.2.3.4 serves not only domain name xyz.com, but also domain name ABC.com. Accordingly, IP address 1.2.3.4 is marked or flagged as being shared. In contrast, IP addresses 5.6.7.8 and 10.11.12.13, associated with web.com and store.com, respectively, are not shared. As such, those IP addresses are noted as not being shared.

Thus, and referring again to FIG. 2, once DNS server 150 builds its list of shared IP addresses, or alternatively, marks a relevant IP address as being shared, such information can be shared with other network devices, including cloud connector/DNS proxy 130 to, among other possible purposes, optimize whitelisting, as will be explained below.

At 212, host 120, perhaps operating a web browser application, seeks to know the IP address of a given domain, and accordingly sends a DNS request. That DNS request is received by cloud connector/DNS proxy 130. In the embodiments described herein, cloud connector/DNS proxy 130 is the component within the topology of FIG. 1 that is responsible for coordinating traffic whitelisting. Those skilled in the art will appreciate, however, that other network components may also perform this function.

Cloud connector/DNS proxy 130, at 214, then forwards the DNS request to DNS server 150, and includes an extended DNS (EDNS) option that indicates that cloud connector/DNS proxy 130 wants to learn whether the resolved IP address is shared across domains.

At 216, the domain name is resolved to a given IP address and it is determined either from a separate list, or from a flag or marked field, that the given IP address is shared, or not.

At 218, a DNS response is returned to cloud connector/DNS proxy 130, and includes an EDNS option to indicate that the IP address is shared across domains (or not).

With the receipt of such information, cloud connector/DNS proxy 130 can, at 220, update its local cache of domain name to IP address associations (or just IP addresses) to indicate that the given IP address is shared (or not). The cache in cloud connector/DNS proxy 130 may have a structure like that shown in FIG. 3B, which is similar to that shown in FIG. 3A, but further includes a whitelist field to identify those IP addresses that should be whitelisted. At 222, the DNS response is passed back to host 120 such that data flows related to that domain can now be addressed to the appropriate IP address.

At 224, a web request is made by host 120. That web request includes the IP address provided by the DNS response. The web request is received by cloud connector/DNS proxy 130. There, at 226, cloud connector/DNS proxy 130 determines if the IP address in the request is marked as an IP address shared by multiple domains. That is, cloud connector/DNS proxy 130 will access its cache (e.g., the data of FIG. 3B), and will learn whether the IP address to which the traffic is addressed is an IP address that serves multiple domains. Cloud connector/DNS proxy 130, at 226, may also validate the TLS handshake and certificate to determine if the request is to be whitelisted.

When the traffic is not whitelisted, and at 250, cloud connector/DNS proxy 130 redirects the web request to CWS 170 for inspection at 252. Assuming the inspection passes and the traffic is deemed to be appropriate, the web request is passed, at 254, to the Internet 140 (and ultimately to HTTP(S) server 160) to obtain the desired information/data. At 256, a web response is received and passed back to host 120, via, e.g., CWS 170 (for further inspection) and cloud connector/DNS proxy 130 for connection back to host 120.

When the IP address is determined to be a whitelisted address (indicated at 260), and the IP address is not shared by multiple domains, the web requests, at 262, is sent directly out to the Internet 140 for delivery to HTTP(S) server 160. A web response is transmitted back to host 120 at 264. Notably, this traffic is not subjected to further inspection.

Thus, as can be appreciated, described herein is a substantially optimized solution for domain based whitelisting. An EDNS option is used to signal information from the DNS server to a DNS proxy so that:

a) Devices act as TCP proxy for HTTP(S) flows to white-listed domains whose IP addresses are shared by other domains; and b) Devices act as TLS proxy for TLS 1.3 flows to white-listed domains whose IP addresses are shared by other domains.

Figure 4:
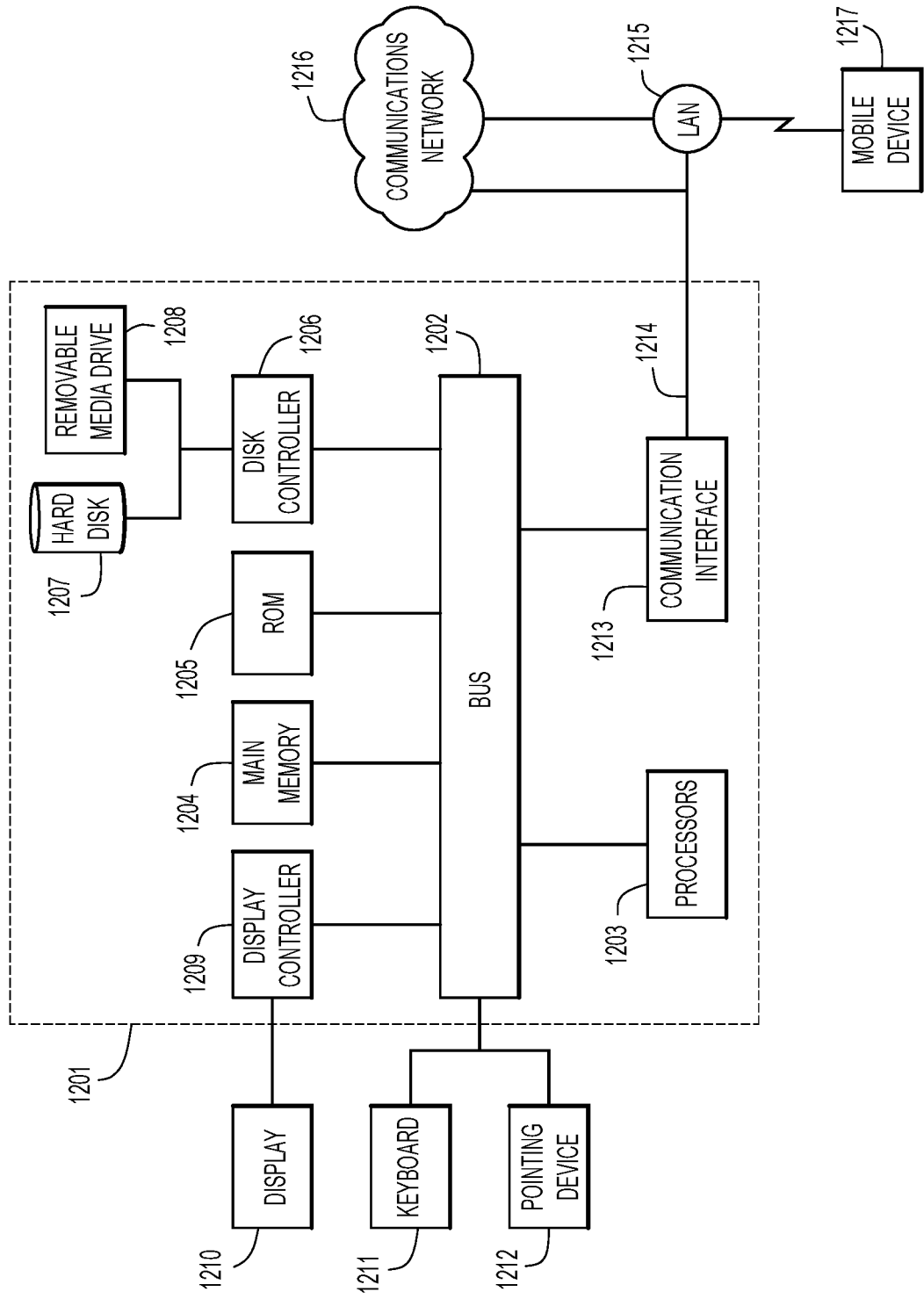
FIG. 4 depicts an apparatus that is configured to operate as a DNS proxy or an DNS server according to an example embodiment.

FIG. 4 depicts an apparatus that is configured to operate as a DNS proxy or DNS server according to an example embodiment. The apparatus may be implemented on a computer system 1201. The computer system 1201 may be programmed to implement a computer based device. The computer system 1201 includes a bus 1202 or other communication mechanism for communicating information, and a processor 1203 coupled with the bus 1202 for processing the information. While the figure shows a signal block 1203 for a processor, it should be understood that the processors 1203 represent a plurality of processors or processing cores, each of which can perform separate processing. The computer system 1201 may also include a main memory 1204, such as a random access memory (RAM) or other dynamic storage device (e.g., dynamic RAM (DRAM), static RAM (SRAM), and synchronous DRAM (SD RAM)), coupled to the bus 1202 for storing information and instructions to be executed by processor 1203. In addition, the main memory 1204 may be used for storing temporary variables or other intermediate information during the execution of instructions by the processor 1203. Main memory may also be used to store logic instructions or software for performing operations shown in FIG. 2.

The computer system 1201 may further include a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 may also include a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1201 may also include a display controller 1209 coupled to the bus 1202 to control a display 1210, such as a cathode ray tube (CRT) or liquid crystal display (LCD), for displaying information to a computer user. The computer system 1201 may include input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing operations of the embodiments described herein in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1201, for driving a device or devices for implementing the described embodiments, and for enabling the computer system 1201 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216, such as the Internet 140 in FIG. 1. For example, the communication interface 1213 may be a wired or wireless network interface card to attach to any packet switched (wired or wireless) LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local are network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The above description is intended by way of example only. Various modifications and structural changes may be made therein without departing from the scope of the concepts described herein and within the scope and range of equivalents of the claims.

What is claimed is:

1. A method, comprising:
    receiving, via a network interface, from a host device, a domain name service request for a first domain;
    sending, via the network interface, the domain name service request for the first domain to a domain name service server, and including therein a query as to whether the first domain resolves to an Internet Protocol (IP) address shared by another domain;

receiving, via the network interface, from the domain name service server a response that indicates, via an extended domain name service response option, that the first domain resolves to an IP address shared by another domain;

storing, in memory, the IP address and an indication that the IP address is shared by another domain;

detecting an IP address in a SYN packet of a dataflow;

determining if the IP address in the SYN packet matches another IP address stored in memory; and when the IP address in the SYN packet matches the another IP address stored in memory and is not shared by another domain, whitelisting the dataflow.

2. The method of claim 1, wherein the query is implemented as an extended domain name service response option.

3. The method of claim 1, wherein when the IP address in the SYN packet matches the another IP address stored in memory and is shared by another domain, causing the dataflow to be inspected.

4. The method of claim 3, further comprising inspecting transport layer security parameters when the dataflow is an HTTPS dataflow.

5. The method of claim 3, further comprising inspecting HTTP header parameters when the dataflow is an HTTP dataflow.

6. An apparatus comprising:
a network interface unit configured to enable communications via a network;
a memory configured to store logic instructions; and
a processor, when executing the logic instructions, configured to:
receive, via the network interface, from a host device, a domain name service request for a first domain;
send, via the network interface, the domain name service request for the first domain to a domain name service server, and include therein a query as to whether the first domain resolves to an Internet Protocol (IP) address shared by another domain;
receive, via the network interface, from the domain name service server a response that indicates, via an extended domain name service response option, that the first domain resolves to an IP address shared by another domain;
store, in memory, the IP address and an indication that the IP address is shared by another domain;
detect an IP address in a SYN packet of a dataflow;
determine if the IP address in the SYN packet matches another IP address stored in the memory; and
when the IP address in the SYN packet matches the another IP address stored in memory and is not shared by another domain, whitelist the dataflow.

7. The apparatus of claim 6, wherein the processor, when executing the logic instructions, is further configured to:
send the query as an extended domain name service response option.

8. The apparatus of claim 6, wherein the processor, when executing the logic instructions, is further configured to:
cause the dataflow to be inspected when the IP address in the SYN packet matches the another IP address stored in memory and is shared by another domain.

9. The apparatus of claim 8, wherein the processor, when executing the logic instructions, is further configured to:
inspect transport layer security parameters when the dataflow is an HTTPS dataflow.

10. The apparatus of claim 8, wherein the processor, when executing the logic instructions, is further configured to:
inspect HTTP header parameters when the dataflow is an HTTP dataflow.

11. The apparatus of claim 8, wherein the processor, when executing the logic instructions, is further configured to:
cause the dataflow to be inspected by a cloud web security service.

12. The apparatus of claim 6, wherein the processor, when executing the logic instructions, is further configured to:
send the domain name service request via an application programming interface (API).

* * * * *